US011192473B2

(12) United States Patent
Schmitz et al.

(10) Patent No.: US 11,192,473 B2
(45) Date of Patent: Dec. 7, 2021

(54) RELEASE HANDLE FOR RECLINER MECHANISM OF VEHICLE SEAT

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US); Christopher J. Ryan, Fraser, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 16/996,991

(22) Filed: Aug. 19, 2020

(65) Prior Publication Data
US 2021/0061139 A1  Mar. 4, 2021

Related U.S. Application Data

(60) Provisional application No. 62/893,895, filed on Aug. 30, 2019.

(51) Int. Cl.
*B60N 2/23* (2006.01)
*B60N 2/20* (2006.01)
(Continued)

(52) U.S. Cl.
CPC ............. *B60N 2/20* (2013.01); *B60N 2/2227* (2013.01); *B60N 2/236* (2015.04); *B60N 2/235* (2013.01); *B60N 2/2352* (2013.01); *B60N 2/2356* (2013.01)

(58) Field of Classification Search
CPC ...... B60N 2/235; B60N 2/236; B60N 2/2352; B60N 2/2356
See application file for complete search history.

(56) References Cited

U.S. PATENT DOCUMENTS 3,736,026 A   5/1973  Ziegler et al.
3,953,069 A   4/1976  Tamura et al.
(Continued)

FOREIGN PATENT DOCUMENTS

CA   2869816 A1   10/2013
CN   1291566 A    4/2001
(Continued)

OTHER PUBLICATIONS

Office Action regarding Chinese Patent Application No. 201910334168.9, dated Apr. 30, 2021. Translation provided by Unitalen Attorneys at Law.
(Continued)

*Primary Examiner* — Syed A Islam
(74) *Attorney, Agent, or Firm* — Harness, Dickey & Pierce, P.L.C.

(57) ABSTRACT

A vehicle-seat-recliner assembly may include first and second recliner hearts, a release handle, a cross-member, a handle pin, a handle-travel-limiter, and a reinforcement member. The release handle is connected with the first recliner heart and is rotatable relative to the brackets to move the first recliner heart between locked and unlocked states. The cross-member is connected to the recliner hearts and transmits torque from the release handle to the second recliner heart to move the recliner hearts between the locked and unlocked states. The handle pin engages the release handle. The handle-travel-limiter may include a flange portion and a shaft portion. The shaft portion may include an aperture configured to receive the cross-member. The flange portion extends radially outward from the shaft portion. The handle pin engages the handle-travel-limiter. The reinforcement member may be fixed to the handle-travel-limiter and the handle pin.

20 Claims, 7 Drawing Sheets

(51) Int. Cl.
  *B60N 2/22*   (2006.01)
  *B60N 2/235*  (2006.01)

(56) References Cited

U.S. PATENT DOCUMENTS

| | | |
|---|---|---|
| 4,219,234 A | 8/1980 | Bell |
| 4,243,264 A | 1/1981 | Bell |
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 * | 4/2013 | Tanguy ............... B60N 2/236 297/367 L |
| 8,449,034 B2 | 5/2013 | Tame et al. |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,150,387 B2 * | 12/2018 | Hiemstra ............... B60N 2/22 |
| 10,279,709 B2 | 5/2019 | Suzuki et al. |
| 10,399,466 B2 | 9/2019 | Chang |
| 10,610,018 B1 * | 4/2020 | Madhu ............... B60N 2/2362 |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0056124 A1 | 3/2009 | Krebs et al. |

(56) References Cited

U.S. PATENT DOCUMENTS

| | | |
|---|---|---|
| 2009/0072602 A1 | 3/2009 | Schuler |
| 2010/0072802 A1 | 3/2010 | Smith et al. |
| 2010/0096896 A1 | 4/2010 | Nonomiya |
| 2010/0231021 A1 | 9/2010 | Myers et al. |
| 2010/0283304 A1 | 11/2010 | Thiel |
| 2010/0308635 A1 | 12/2010 | Tame et al. |
| 2010/0320823 A1 | 12/2010 | Thiel |
| 2011/0068612 A1 | 3/2011 | Thiel |
| 2011/0127814 A1 | 6/2011 | Thiel |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0248841 A1 | 10/2012 | Hellrung et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0301682 A1 | 10/2014 | Leppla |
| 2015/0015044 A1 | 1/2015 | Teufel et al. |
| 2015/0069809 A1 | 3/2015 | Matt |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0339810 A1 | 11/2016 | Pluta et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2018/0056819 A1 | 3/2018 | Schmitz et al. |
| 2018/0103760 A1 | 4/2018 | Fujita et al. |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0039528 A1 | 2/2021 | Poptani et al. |

FOREIGN PATENT DOCUMENTS

| | | |
|---|---|---|
| CN | 1457306 A | 11/2003 |
| CN | 1840382 A | 10/2006 |
| CN | 101616820 A | 12/2009 |
| CN | 101925485 A | 12/2010 |
| CN | 202086037 U | 12/2011 |
| CN | 102442228 A | 5/2012 |
| CN | 103025568 A | 4/2013 |
| CN | 203228664 U | 10/2013 |
| CN | 103702860 A | 4/2014 |
| CN | 203974603 U | 12/2014 |
| CN | 105189196 A | 12/2015 |
| CN | 205130981 U | 4/2016 |
| CN | 112339625 A | 2/2021 |
| DE | 4324734 A1 | 1/1995 |
| DE | 102007002366 B3 | 7/2008 |
| DE | 102008026176 A1 | 12/2009 |
| DE | 102011108976 A1 | 1/2013 |
| DE | 102012008940 A1 | 11/2013 |
| EP | 1074426 A2 | 2/2001 |
| GB | 1546104 A | 5/1979 |
| JP | 2000084684 A | 3/2000 |
| JP | 2002119349 A | 4/2002 |
| JP | 5290789 B2 | 9/2013 |
| JP | 5555969 B2 | 7/2014 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |
| WO | WO-2013167240 A1 | 11/2013 |

OTHER PUBLICATIONS

SPI Lasers UK Ltd., "Opening new possibilities with single mode oscillation welding (CW)." Presented at: Laser World of Photonics China; Shanghai, China (Mar. 2008).

Office Action regarding Canadian Patent Application No. 2,812,408, dated Jun. 17, 2016.

Office Action regarding German Patent Application No. 102016114406.1, dated Apr. 27, 2020. Translation provided by Witte, Weller & Partner Patentanwälte mbB.

International Search Report regarding International Application No. PCT/US2020/021377, dated Jun. 30, 2020.

Written Opinion of the International Searching Authority regarding International Application No. PCT/US2020/021377, dated Jun. 30, 2020.

Office Action regarding German Patent Application No. 102019211855.0, dated Feb. 4, 2021. Partial translation provided by Bardehle Pagenberg Partnerschaft mbB.

Office Action regarding German Patent Application No. 102019212517.4, dated Mar. 11, 2021. Partial translation provided by Bardehle Pagenberg Partnerschaft mbB.

Office Action regarding Indian Patent Application No. 201921032346, dated Mar. 18, 2021.

Office Action regarding German Patent Application No. 102013103671.6, dated May 20, 2021. Translation provided by Witte, Weller & Partner Patentanwälte mbB.

First Chinese Office Action regarding Application No. 201910801476.8 dated Aug. 10, 2021. English translation provided by Unitalen Attorneys at Law.

* cited by examiner

RELEASE HANDLE FOR RECLINER MECHANISM OF VEHICLE SEAT

CROSS-REFERENCE TO RELATED APPLICATIONS

This application claims the benefit of U.S. Provisional Application No. 62/893,895, filed on Aug. 30, 2019. The entire disclosure of the above application is incorporated herein by reference.

FIELD

The present disclosure relates to a release handle for a recliner mechanism of a vehicle seat.

BACKGROUND

This section provides background information related to the present disclosure and is not necessarily prior art.

Many vehicles include seats with manually operated recliner mechanisms. Often, a release handle is provided to unlock the recliner mechanism to allow adjustment of the seat between upright and reclined positions. An interface between the release handle and the rest of the recliner mechanism can be a failure mode and/or a source of buzz-squeak-rattle (BSR). For example, intended and/or unintended forces applied to the release handle by a user can cause damage to the release handle, the recliner mechanism, and/or the interface between the release handle and the rest of the recliner mechanism. The present disclosure provides a vehicle-seat-recliner assembly that is able to withstand higher loads and reduces or eliminates BSR.

SUMMARY

This section provides a general summary of the disclosure, and is not a comprehensive disclosure of its full scope or all of its features.

In one form, the present disclosure provides a vehicle-seat-recliner assembly that may include first and second recliner hearts, a release handle, a cross-member, a handle pin, a handle-travel-limiter, and a reinforcement member. The first and second recliner hearts are mounted to first and second brackets, respectively. The release handle is drivingly connected with the first recliner heart and is rotatable relative to the first and second brackets to move the first recliner heart between a locked state and an unlocked state. The cross-member is connected to the first and second recliner hearts and transmits torque from the release handle to the second recliner heart to move the second recliner heart with the first recliner heart between the locked and unlocked states. The handle pin engages the release handle. The handle-travel-limiter may include a flange portion and a shaft portion. The shaft portion may include an aperture configured to receive the cross-member. The flange portion may extend radially outward from the shaft portion. The handle pin may be fixedly engaged with the handle-travel-limiter. The reinforcement member may be fixed to the handle-travel-limiter and the handle pin.

In some configurations of the assembly of the above paragraph, the reinforcement member is embedded within the handle-travel-limiter.

In some configurations of the assembly of either of the above paragraphs, the reinforcement member includes an aperture that fixedly receives a first end of the handle pin.

In some configurations of the assembly of any of the above paragraphs, the handle-travel-limiter is formed from a first material, and the reinforcement member is formed from a second material that is different from the first material.

In some configurations of the assembly of any of the above paragraphs, the handle-travel-limiter is molded over at least a portion of the reinforcement member.

In some configurations of the assembly of any of the above paragraphs, the first material is a polymeric material, and the second material is a metallic material.

In some configurations of the assembly of any of the above paragraphs, a second end of the handle pin includes a plurality of splines and is received within an aperture in the release handle.

In some configurations of the assembly of any of the above paragraphs, the first end of the handle pin includes a plurality of radially outwardly extending protrusions. The aperture in the reinforcement member may include a plurality of radially outwardly extending cutouts that each receive a respective one of the protrusions.

In some configurations of the assembly of any of the above paragraphs, the first end of the handle pin includes another plurality of radially outwardly extending protrusions that are at least partially embedded in the handle-travel-limiter.

In some configurations, the assembly of any of the above paragraphs includes a spring that rotationally biases the release handle toward a position corresponding to the locked state.

In some configurations of the assembly of any of the above paragraphs, the handle-travel-limiter may include a pair of tabs that engage the spring.

In some configurations, the assembly of any of the above paragraphs includes a handle-travel bracket fixed relative to the first bracket and including an aperture through which the cross-member extends and a flange portion that interferes with the flange portion of the handle-travel-limiter to limit an amount of rotational travel of the release handle relative to the first bracket.

In another form, the present disclosure provides a method of assembling a vehicle-seat-recliner assembly. The method may include: providing a handle pin including a first end having a plurality of radially outwardly extending protrusions and a second end having a plurality of splines; providing a reinforcement member including an aperture having a plurality of radially outwardly extending cutouts; inserting the first end of the handle pin in the aperture of the reinforcement member such that each of the protrusions is received in a respective one of the cutouts; fixing the handle pin relative to the reinforcement member after inserting the first end of the handle pin in the aperture of the reinforcement member; molding a handle-travel-limiter over at least a portion of the reinforcement member after fixing the handle pin relative to the reinforcement member such that the reinforcement member is embedded in a flange portion of the handle-travel-limiter; inserting a cross-member into a shaft portion of the handle-travel-limiter; and attaching a release handle to a second end of the handle pin. The cross-member is connected to first and second recliner hearts and is operable to transmit torque from the release handle to the second recliner heart to move the second recliner heart with the first recliner heart between locked and unlocked states.

In some configurations of the method of the above paragraph, the handle-travel-limiter is formed from a first material, and the reinforcement member is formed from a second material that is different from the first material.

In some configurations of the method of the above paragraph, the first material is a polymeric material, and the second material is a metallic material.

In some configurations of the method of any of the above paragraphs, a second end of the handle pin includes a plurality of splines and is received within an aperture in the release handle.

In some configurations, the method of any of the above paragraphs includes providing a spring that rotationally biases the release handle toward a position corresponding to the locked state.

In some configurations of the method of any of the above paragraphs, the handle-travel-limiter includes a pair of tabs that engage the spring.

In some configurations, the method of any of the above paragraphs includes providing a handle-travel bracket fixed relative to the first recliner heart and including an aperture through which the cross-member extends and a flange portion that interferes with the flange portion of the handle-travel-limiter to limit an amount of rotational travel of the release handle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
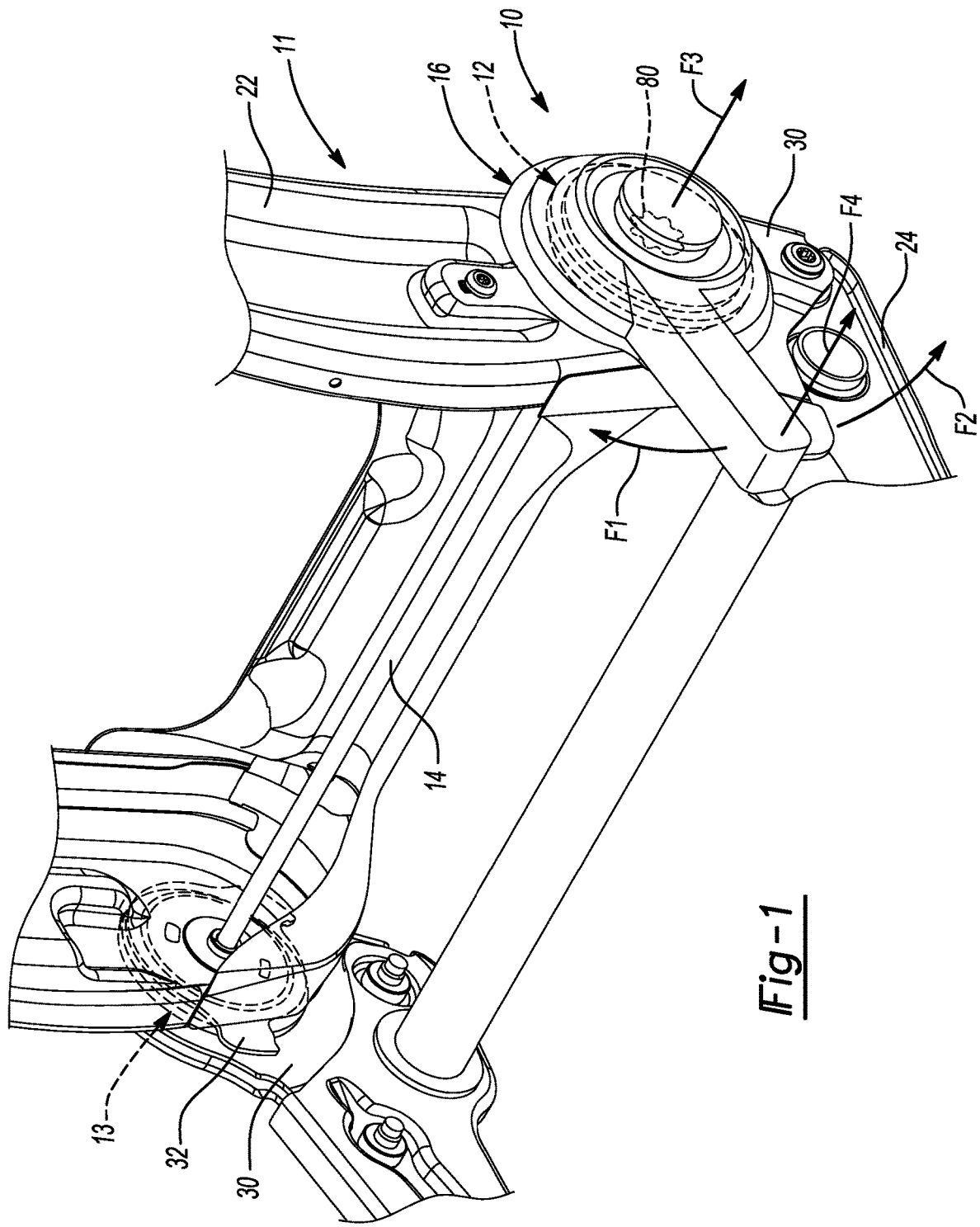
FIG. 1 is a partial perspective view of a vehicle seat assembly having a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
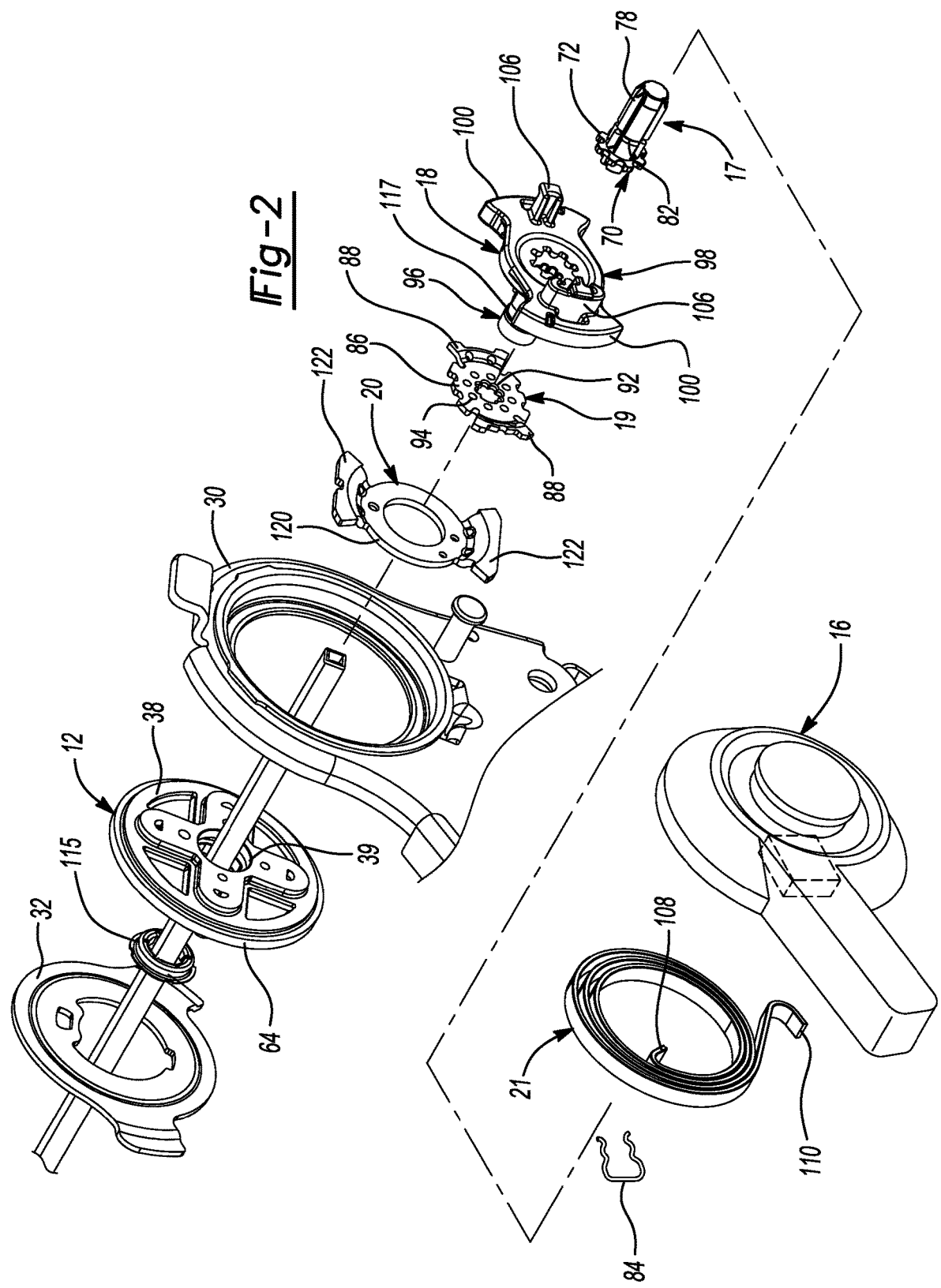
FIG. 2 is an exploded view of the recliner assembly.

With reference to FIGS. 1 and 2, a recliner assembly 10 is provided that may be incorporated into a vehicle seat assembly 11 having a seatback frame 22 and a seat bottom frame 24. The seat assembly 11 may be positioned in a vehicle. The recliner assembly 10 may include a first recliner heart (e.g., a round recliner mechanism) 12, a second recliner heart (e.g., a round recliner mechanism) 13, an cross-member 14, a release handle 16 (i.e., a manually operated hand lever), a handle pin 17, a handle-travel-limiter 18, a reinforcement member 19, a handle-travel bracket 20, and a spring 21.

The first and second recliner hearts 12, 13 may be operable in a locked state preventing relative rotation between the seatback frame 22 and the seat bottom frame 24 and an unlocked state permitting relative rotation between the seatback frame 22 and the seat bottom frame 24 between an upright position and a rearward-reclined position. In some configurations, the first and second recliner hearts 12, 13 allow the seatback frame 22 to move to a forward dump position when in the unlocked state. As shown in FIGS. 1 and 2, each of the recliner hearts 12, 13 may be attached to a first bracket 30 and a second bracket 32. The first bracket 30 may be fixedly attached (e.g., by fasteners and/or welding) to the seat bottom frame 24. The second bracket 32 may be fixedly attached (e.g., by fasteners and/or welding) to the seatback frame 22.

The first and second recliner hearts 12, 13 can be any suitable type of recliner mechanism. For example, the recliner hearts 12, 13 could be similar or identical to the recliner hearts disclosed in Applicant's commonly owned U.S. Patent Application Publication No. 2018/0056819, the entire disclosure of which is incorporated herein by reference. The first and second recliner hearts 12, 13 may be similar or identical to each other, and therefore, the following description of the first recliner heart 12 is also applicable to the second recliner heart 13.

Figure 4:
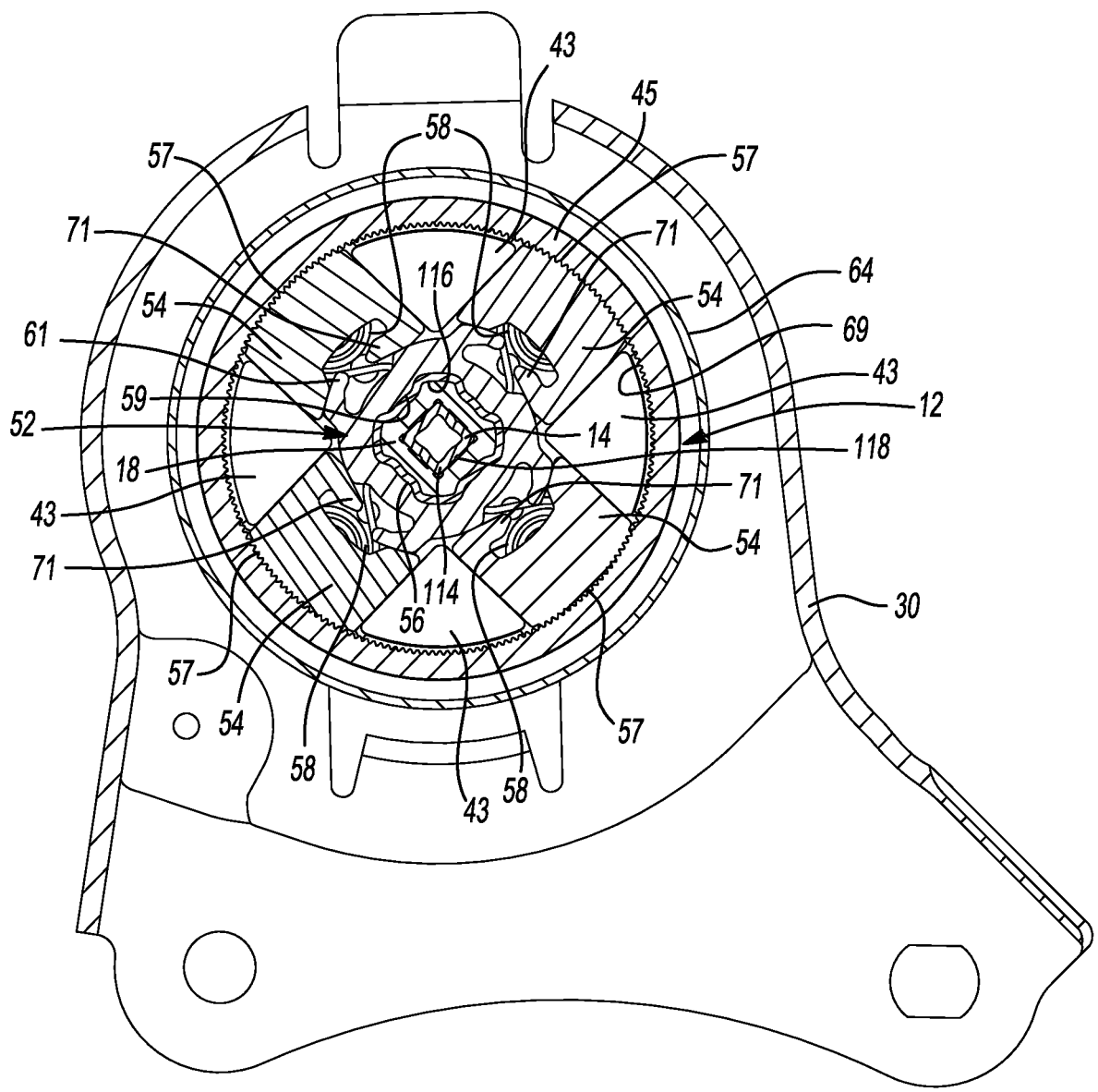
FIG. 4 is a cross-sectional view of a recliner heart of the recliner assembly.

The first recliner heart 12 may include a guide plate 38 (FIG. 2), a ratchet plate 45 (FIG. 4), a cam 52 (FIG. 4), a plurality of pawls 54 (FIG. 4), a connector disk 56 (FIG. 4), a plurality of coil springs 58 (FIG. 4), a control ring (not shown), and an encapsulation ring 64 (FIGS. 2 and 4). The recliner hearts 12, 13 are operable, in a locked state, to lock the recliner assembly 10 to prevent relative rotation between the seatback frame 22 and the seat bottom frame 24. The recliner hearts 12, 13 are operable, in an unlocked state, to unlock the recliner assembly 10 to allow relative rotation between the seatback frame 22 and seat bottom frame 24.

The guide plate 38 may be fixedly mounted to the first bracket 30. The guide plate 38 may be a generally round disk with a central aperture 39 (FIG. 2) and a plurality of bosses 43 (FIG. 4). Each of the pawls 54 is slidably received between corresponding adjacent bosses 43.

The ratchet plate 45 may be a generally round disk and may include a central aperture and a cylindrical recess. A plurality of teeth 69 (FIG. 4) may be formed on an inner diametrical wall defining the cylindrical recess of the ratchet plate 45. The second bracket 32 may be welded and/or otherwise suitably fixed to the seatback frame 22 and the ratchet plate 45 to attach the ratchet plate 45 to the seatback frame 22. The ratchet plate 45 may be mounted to the guide plate 38 such that the cylindrical recess of the ratchet plate 45 is substantially concentric with outer radii of the bosses 43. The encapsulation ring 64 may have a U-shaped cross-section and may be disposed generally around the outer peripheries of the ratchet plate 45 and the guide plate 38 to rotatably couple the ratchet plate 45 to the guide plate 38.

The pawls 54 may be arranged around the central aperture 39 on the guide plate 38 such that each pawl 54 is slidably disposed between respective adjacent bosses 43, as shown in FIG. 4. An edge of each pawl 54 may include a plurality of teeth 57 configured to meshingly engage the teeth 69 of the ratchet plate 45. Each pawl 54 may also include a latch 71 at an end opposite the teeth 57.

The cam 52 may be a generally round disk having an aperture 59 and a plurality of radial latch protrusions 61 arranged around the aperture 59. The cam 52 is rotatable relative to the pawls 54 and the ratchet plate 45 such that the latch protrusions 61 can selectively engage the latches 71 of the pawls 54 to move the pawls 54 radially inward and out of engagement with the teeth 69 of the ratchet plate 45 (i.e., into the unlocked state).

The connector disk 56 may be rotatably fixed to the cam 52 and the handle-travel-limiter 18 (which is rotationally fixed to the cross-member 14), thereby rotationally fixing the cam 52 relative to the cross-member 14 and the release handle 16. In this manner, rotation of the release handle 16 causes corresponding rotation of the cam 52, which moves the recliner hearts 12, 13 between the locked and unlocked states. As shown in FIG. 4, the connector disk 56 may include a plurality of flanges that are each engaged with a corresponding one of the coil springs 58. The coil springs 58 rotationally biases connector disk 56 and the cam 52 in a manner that causes the latch protrusions 61 to force the pawls 54 radially outwardly into the locked state, whereby the teeth 57 of the pawls 54 engage the teeth 69 of the ratchet plate 45.

Figure 5:
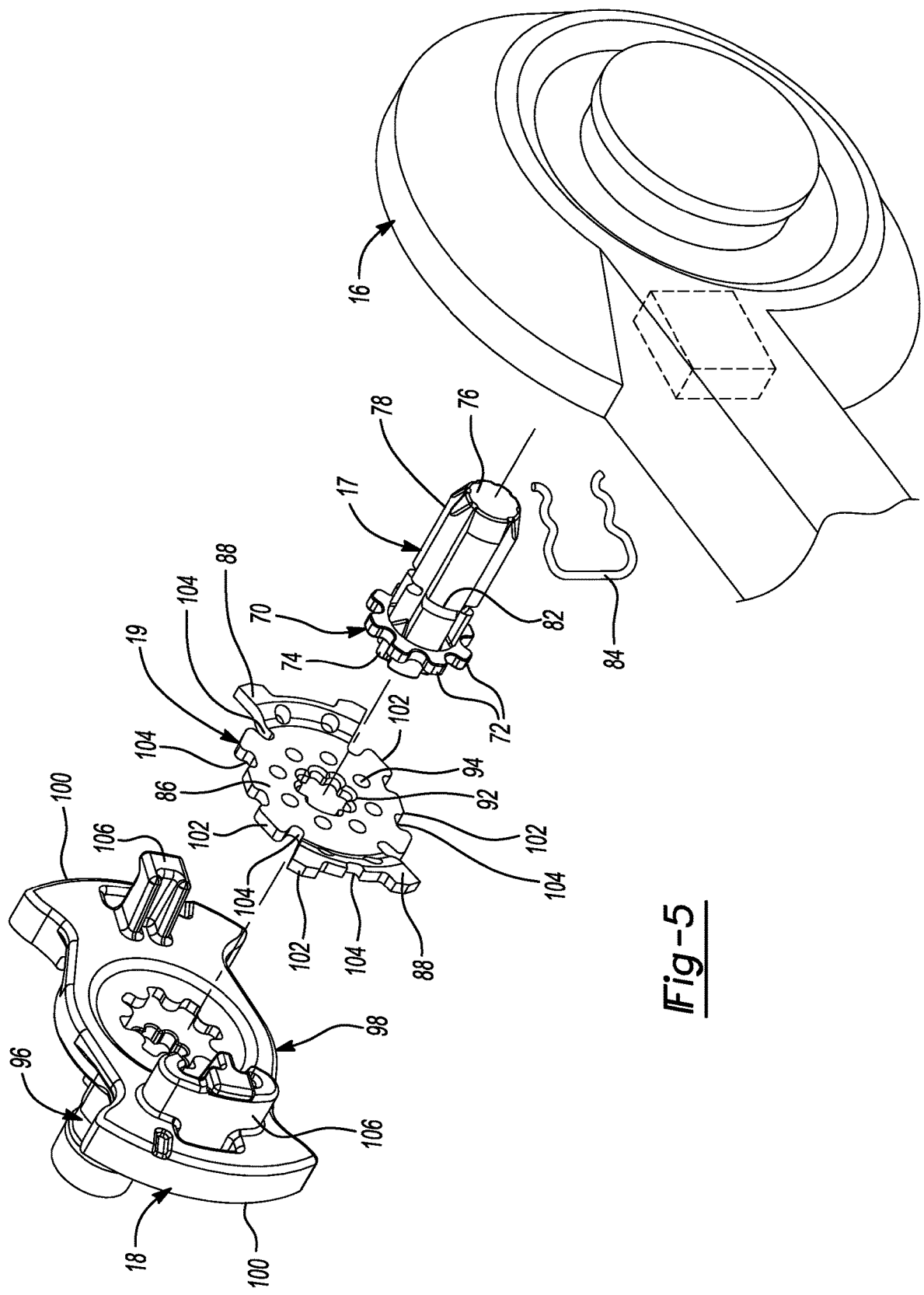
FIG. 5 is a partial exploded view of the recliner assembly.
Figure 7:
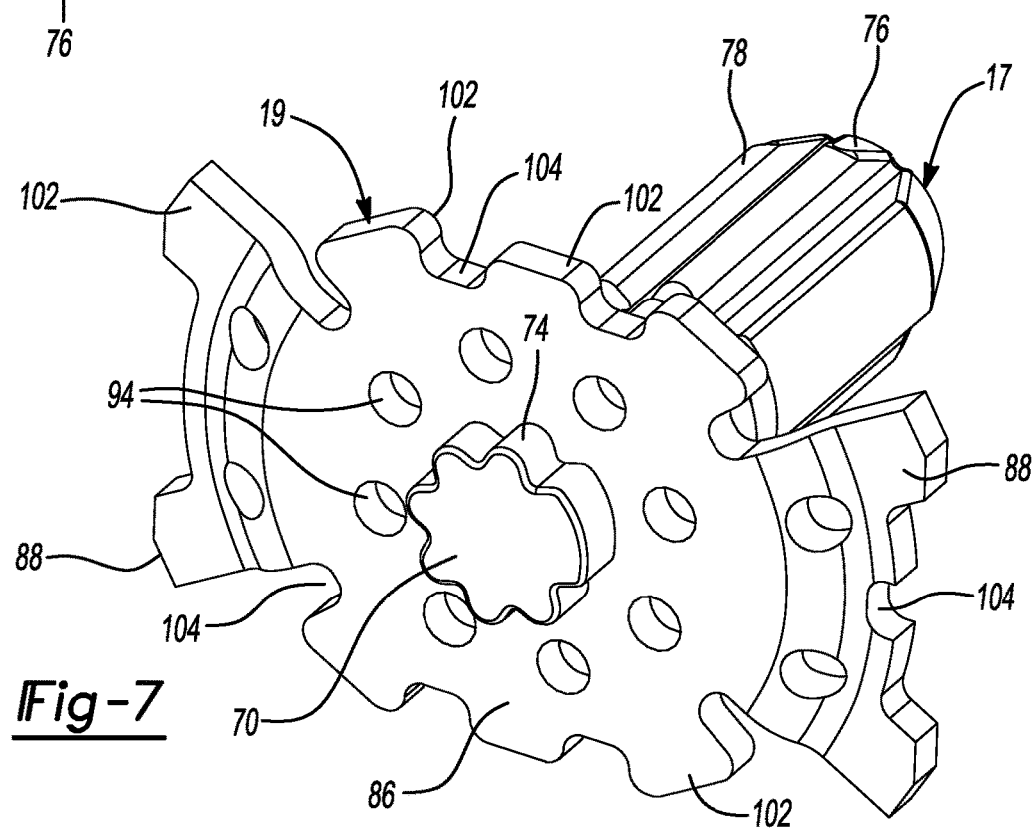
FIG. 7 is another perspective view of the reinforcement member and handle pin.

As shown in FIGS. 2 and 5, the handle pin 17 may include a first end 70 having a plurality of radially outwardly extending first protrusions 72 and a plurality of radially outwardly extending second protrusions 74 (FIGS. 5 and 7). The second protrusions 74 may be disposed at a distal end of the first end 70. The first protrusions 72 may be disposed axially between the second protrusions 74 and a second end 76 of the handle pin 17. The first protrusions 72 may extend radially outward farther than the second protrusions 74.

The second end 76 of the handle pin 17 may include a plurality of splines 78 that are received within a similarly shaped aperture 80 (FIG. 1) in the release handle 16. In this manner, the splines 78 rotationally fix the release handle 16 to the handle pin 17. The handle pin 17 may also include a groove 82 that extends circumferentially around at least a portion of the diameter of the handle pin 17 (i.e., perpendicular to the splines 78). A retainer clip 84 (FIG. 5) may be fixed to the release handle 16 and may snap into the groove 82 to axially retain the release handle 16 on the handle pin 17. The handle pin 17 may be formed from a metallic material (e.g., steel).

Figure 6:
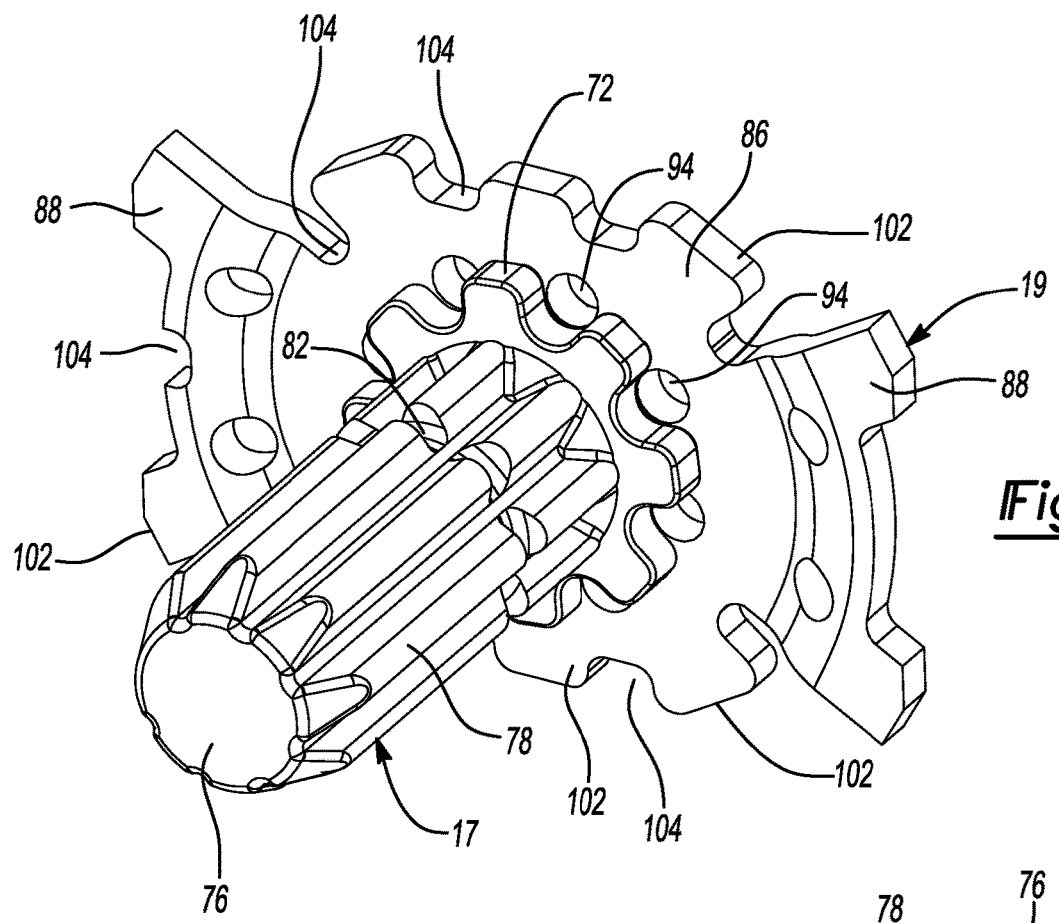
FIG. 6 is a perspective view of a reinforcement member and a handle pin of the recliner assembly.

As shown in FIGS. 5-7, the reinforcement member 19 may be a generally flat member having a main body portion 86 and a pair of flanges 88 extending outwardly from the main body portion 86. The main body portion 86 may include a central aperture 90 including radially outwardly extending cutouts 92 (FIG. 5). The cutouts 92 correspond in shape and size with the second protrusions 74 of the handle pin 17 such that the second protrusions 74 can be received through the cutouts 92. During assembly of the handle pin 17 to reinforcement member 19, the distal end of the first end 70 of the handle pin 17 can be press fit into the aperture 90 and staked or deformed (and/or welded) to the main body portion 86 of the reinforcement member 19 to fix the handle pin 17 relative to the reinforcement member 19. The main body portion 86 may also include a plurality of apertures 94 arranged around the central aperture 90. When the handle pin 17 is fixed to the reinforcement member 19, the first protrusions 72 may abut the main body portion 86 of the reinforcement member 19 and each of the first protrusions 72 may be disposed between respective adjacent apertures 94, as shown in FIG. 6. The reinforcement member is formed from a metallic material, for example.

Figure 8:
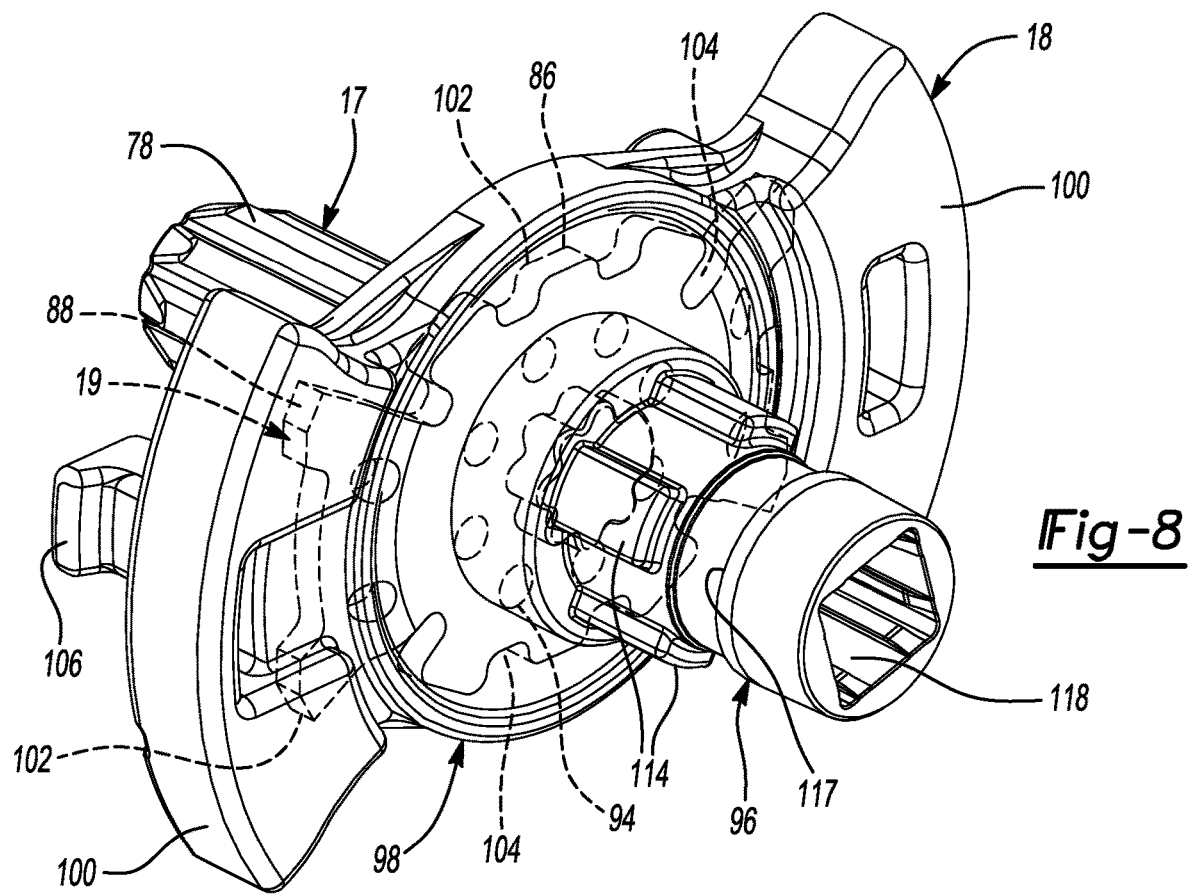
FIG. 8 is a perspective view of the handle pin and a handle-travel-limiter with the reinforcement member embedded within the handle-travel-limiter.
Figure 9:
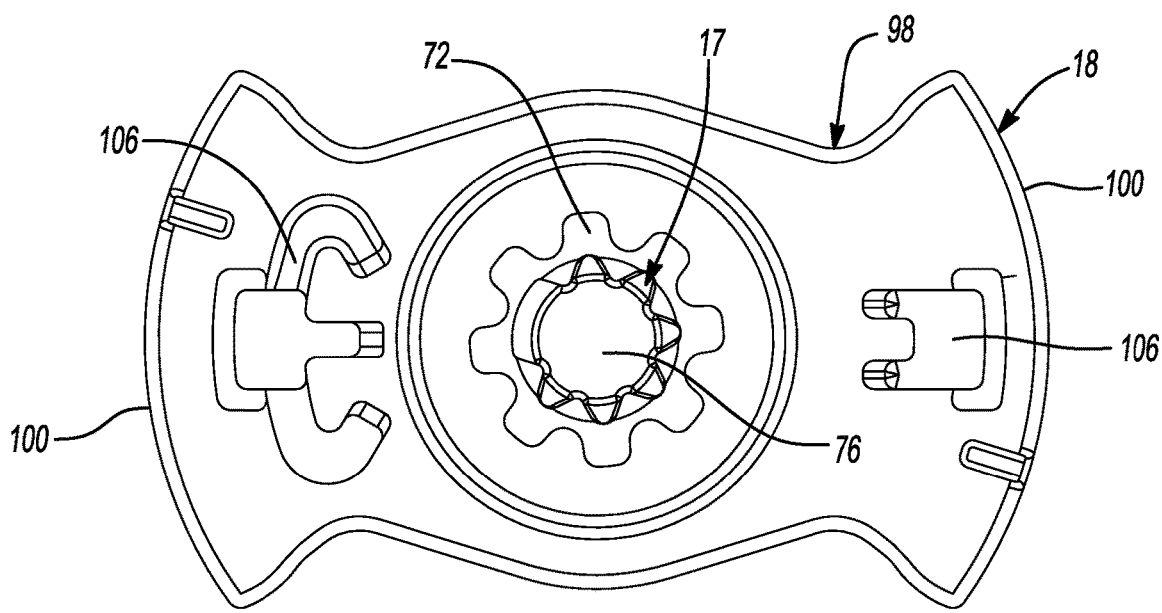
FIG. 9 is a plan view of the handle-travel-limiter and the handle pin.

The handle-travel-limiter 18 may be formed from a polymeric material, for example. As shown in FIGS. 5, 8, and 9, the handle-travel-limiter 18 may include a shaft portion 96 and a flange portion 98 that extends radially outwardly from the shaft portion 96. In some configurations, the flange portion 98 is molded over the reinforcement member 19 such that the reinforcement member 19 is at least partially embedded within the handle-travel-limiter 18 (FIG. 8). In some configurations, the flange portion 98 is also molded over the first protrusions 72 of the handle pin 17 such that the first protrusions 72 are also at least partially embedded within the handle-travel-limiter 18 (FIGS. 3 and 9).

The flange portion 98 of the handle-travel-limiter 18 may include a pair of flanges 100 that form a generally bow-tie shape. The flanges 100 may surround the flanges 88 of the reinforcement member 19. That is, the flanges 88 may extend into the flanges 100. When the handle-travel-limiter 18 is molded over the reinforcement member 19, the polymeric material of the handle-travel-limiter 18 flows around and through the various protrusions 102 and cutouts 104 (FIGS. 5 and 8) defining the outer periphery of the reinforcement member 19, thereby strengthening the engagement with the reinforcement member 19 and locking the handle-travel-limiter 18 to the reinforcement member 19. Furthermore, when the handle-travel-limiter 18 is molded over the reinforcement member 19, the polymeric material of the handle-travel-limiter 18 flows through the apertures 94 of the reinforcement member 19 and around the first protrusions 72 of the handle pin 17, which also strengthens the engagement among the handle-travel-limiter 18, the reinforcement member 19 and the handle pin 17 and locks the handle-travel-limiter 18, the reinforcement member 19 and the handle pin 17 to each other.

Figure 3:
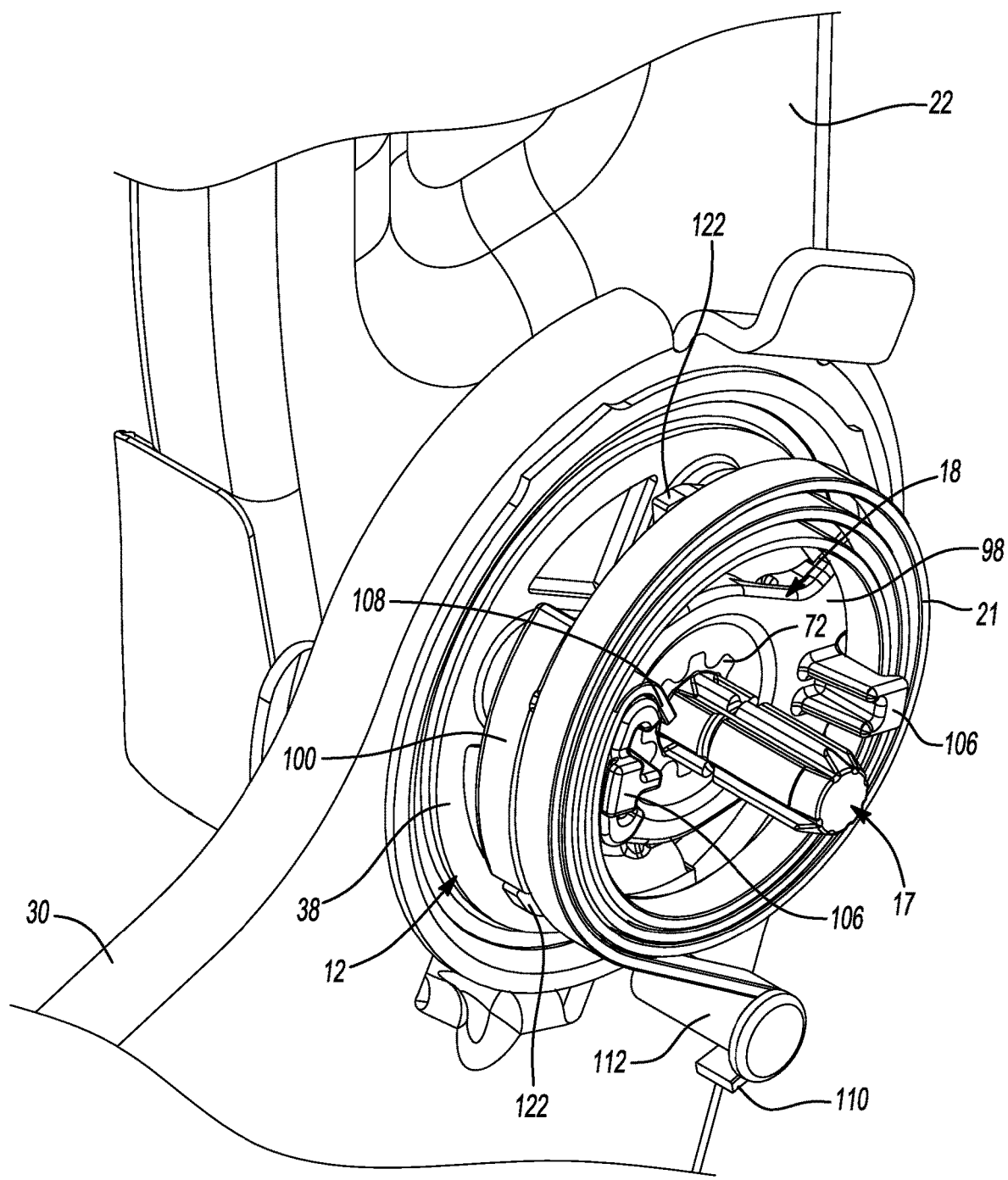
FIG. 3 is a perspective view of the recliner assembly with a release handle removed.

As shown in FIGS. 3 and 5, the flange portion 98 of the handle-travel-limiter 18 may also include a pair of tabs 106 that engage the spring 21. As shown in FIG. 3, one end 108 of the spring 21 may be hooked onto one of the tabs 106. Another end 110 of the spring 21 may be hooked onto a pin 112 that may be fixed to the first bracket 30.

As shown in FIG. 8, the shaft portion 96 of the handle-travel-limiter 18 may protrude from a central portion of the flange portion 98. The shaft portion 96 may include a plurality of protrusions 114 arranged around an outer diametrical surface of the shaft portion 96. As shown in FIG. 4, the protrusions 114 may be received in corresponding keyways 116 in the connector disk 56 to rotationally fix the handle-travel-limiter 18 to the connector disk 56 and the cam 52. As shown in FIG. 8, the shaft portion 96 may also include a central aperture 118 that extends axially through a distal end of the shaft portion 96. The central aperture 118 may be sized and shaped to receive a portion of the cross-member 14. In the particular example shown in the figures, the cross-member 14 has a rectangular or square profile that fits within a rectangular or square profile of the central aperture 118 of the handle-travel-limiter 18 (shown in FIG. 4). The shaft portion 96 may extend through the first recliner heart 12, and a retainer 115 (FIG. 2) fixed to the recliner heart 12 may engage a groove 117 on the shaft portion 96 to axially secure the handle-travel-limiter 18 on the cross-member 14.

As shown in FIG. 2, the handle-travel bracket 20 may include a generally circular main body portion 120 and a pair of flanges (or flange portions) 122. The handle-travel bracket 20 may be fixedly attached (e.g., via welding) to the guide plate 38. The main body portion 120 may include a central aperture 124 through which the cross-member 14 extends. The flanges 122 extend radially outward from the main body portion 120. As shown in FIG. 3, the flanges 100 of the handle-travel-limiter 18 may be disposed between the flanges 122 of the handle-travel bracket 20. Interference between the flanges 122 and the flanges 100 limits the amount of rotational travel of the handle-travel-limiter 18 (and thus, the release handle 16) relative to the handle-travel bracket 20 and the guide plate 38. FIG. 3 shows a first one of the flanges 100 abutting a first one of the flanges 122 and spaced apart from a second one of the flanges 122. The rotational distance shown in FIG. 3 between the first one of the flanges 100 and the second one of the flanges 122 defines the extent of the rotational travel of the handle-travel-limiter 18 (and release handle 16) relative to the handle-travel bracket 20 (and guide plate 38).

The recliner assembly 10 of the present disclosure has several advantages over prior-art recliner assemblies. For example, the reinforcement member 19 increases the strength of the interface between the release handle 16 and the handle-travel-limiter 18. That is, the reinforcement member 19 increases the stiffness of the handle-travel-limiter 18. Forming the reinforcement member 19 from a metallic material further improves the strength and stiffness, while minimally affecting the overall weight of the recliner assembly 10.

Molding the handle-travel limiter 18 over the reinforcement member and the first end 70 of the handle pin 17 improves the engagement between the handle-travel-limiter 18 and the reinforcement member 19 and improves the engagement between the handle-travel-limiter 18 and the handle pin 17. Over-molding the handle-travel-limiter 18 from a polymeric material reduces or eliminates the buzz-squeak-rattle (BSR) that often result from metal-on-metal interfaces. The shape of the reinforcement member 19 (e.g., the apertures 94, protrusions 102 and cutouts 104) helps to lock the reinforcement member 19 within the handle-travel-limiter 18.

By forming the handle pin 17 and reinforcement member 19 from metallic materials, the recliner assembly 10 is able to withstand higher loads due to forces applied to the release handle 16 by a user. For example, FIG. 1 shows forces F1, F2, F3, F4 in various directions that a user may apply to the release handle 16 during intended uses and unintended uses of the release handle 16. The metallic materials of the handle pin 17 and reinforcement member 19 and the improved engagement between the handle pin 17 and the reinforcement member 19 allows the recliner assembly 10 to better withstand high loads in the directions of forces F1, F2, F3, F4 as well as forces in other directions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle-seat-recliner assembly comprising:
   a first recliner heart mounted to a first bracket;
   a second recliner heart mounted to a second bracket;
   a release handle drivingly connected with the first recliner heart and rotatable relative to the first and second brackets to move the first recliner heart between a locked state and an unlocked state;

a cross-member connected to the first and second recliner hearts and transmitting torque from the release handle to the second recliner heart to move the second recliner heart with the first recliner heart between the locked and unlocked states;

a handle pin engaging the release handle;

a handle-travel-limiter including a flange portion and a shaft portion, wherein the shaft portion includes an aperture configured to receive the cross-member, wherein the flange portion extends radially outward from the shaft portion, and wherein the handle pin is fixedly engaged with the handle-travel-limiter; and a reinforcement member fixed to the handle-travel-limiter and the handle pin, wherein the reinforcement member is embedded within the handle-travel-limiter, wherein the reinforcement member includes an aperture that fixedly receives a first end of the handle pin, wherein the handle-travel-limiter is formed from a first material, and wherein the reinforcement member is formed from a second material that is different from the first material, wherein the handle-travel-limiter is molded over at least a portion of the reinforcement member, wherein the first end of the handle pin includes a plurality of radially outwardly extending protrusions, and wherein the aperture in the reinforcement member includes a plurality of radially outwardly extending cutouts that each receive a respective one of the protrusions, and wherein the first end of the handle pin includes another plurality of radially outwardly extending protrusions that are at least partially embedded in the handle-travel-limiter.

2. The vehicle-seat-recliner assembly of claim 1, wherein the first material is a polymeric material, and wherein the second material is a metallic material.

3. The vehicle-seat-recliner assembly of claim 1, wherein a second end of the handle pin includes a plurality of splines and is received within an aperture in the release handle.

4. The vehicle-seat-recliner assembly of claim 1, further comprising a spring that rotationally biases the release handle toward a position corresponding to the locked state, and wherein the handle-travel-limiter includes a pair of tabs that engage the spring.

5. The vehicle-seat-recliner assembly of claim 1, further comprising a handle-travel bracket fixed relative to the first bracket and including an aperture through which the cross-member extends and a flange portion that interferes with the flange portion of the handle-travel-limiter to limit an amount of rotational travel of the release handle relative to the first bracket.

6. A vehicle-seat-recliner assembly comprising:
a first recliner heart mounted to a first bracket;
a second recliner heart mounted to a second bracket;
a release handle drivingly connected with the first recliner heart and rotatable relative to the first and second brackets to move the first recliner heart between a locked state and an unlocked state;
a cross-member connected to the first and second recliner hearts and transmitting torque from the release handle to the second recliner heart to move the second recliner heart with the first recliner heart between the locked and unlocked states;
a handle pin engaging the release handle;
a handle-travel-limiter including a flange portion and a shaft portion, wherein the shaft portion includes an aperture configured to receive the cross-member, wherein the flange portion extends radially outward from the shaft portion, and wherein the handle pin is fixedly engaged with the handle-travel-limiter;
a reinforcement member fixed to the handle-travel-limiter and the handle pin; and
a handle-travel bracket fixed relative to the first bracket and including an aperture through which the cross-member extends and a flange portion that interferes with the flange portion of the handle-travel-limiter to limit an amount of rotational travel of the release handle relative to the first bracket.

7. The vehicle-seat-recliner assembly of claim 6, wherein the reinforcement member is embedded within the handle-travel-limiter.

8. The vehicle-seat-recliner assembly of claim 6, wherein the reinforcement member includes an aperture that fixedly receives a first end of the handle pin.

9. The vehicle-seat-recliner assembly of claim 6, wherein the handle-travel-limiter is formed from a first material, and wherein the reinforcement member is formed from a second material that is different from the first material.

10. The vehicle-seat-recliner assembly of claim 9, wherein the first material is a polymeric material, and wherein the second material is a metallic material.

11. The vehicle-seat-recliner assembly of claim 6, wherein the handle-travel-limiter is molded over at least a portion of the reinforcement member.

12. The vehicle-seat-recliner assembly of claim 6, wherein a first end of the handle pin includes a plurality of radially outwardly extending protrusions, and wherein the aperture in the reinforcement member includes a plurality of radially outwardly extending cutouts that each receive a respective one of the protrusions.

13. The vehicle-seat-recliner assembly of claim 12, wherein the first end of the handle pin includes another plurality of radially outwardly extending protrusions that are at least partially embedded in the handle-travel-limiter.

14. The vehicle-seat-recliner assembly of claim 13, wherein a second end of the handle pin includes a plurality of splines and is received within an aperture in the release handle.

15. A method of assembling a vehicle-seat-recliner assembly, the method comprising:
providing a handle pin including a first end having a plurality of radially outwardly extending protrusions and a second end having a plurality of splines;
providing a reinforcement member including an aperture having a plurality of radially outwardly extending cutouts;
inserting the first end of the handle pin in the aperture of the reinforcement member such that each of the protrusions is received in a respective one of the cutouts;
fixing the handle pin relative to the reinforcement member after inserting the first end of the handle pin in the aperture of the reinforcement member;
molding a handle-travel-limiter over at least a portion of the reinforcement member after fixing the handle pin relative to the reinforcement member such that the reinforcement member is embedded in a flange portion of the handle-travel-limiter;
inserting a cross-member into a shaft portion of the handle-travel-limiter; and
attaching a release handle to a second end of the handle pin, wherein the cross-member is connected to first and second recliner hearts and is operable to transmit torque from the release handle to the second recliner heart to move the second recliner heart with the first recliner heart between a locked state and an unlocked state.

16. The method of claim 15, wherein the handle-travel-limiter is formed from a first material, and wherein the reinforcement member is formed from a second material that is different from the first material.

17. The method of claim 16, wherein the first material is a polymeric material, and wherein the second material is a metallic material.

18. The method of claim 17, wherein a second end of the handle pin includes a plurality of splines and is received within an aperture in the release handle.

19. The method of claim 15, further comprising: providing a spring that rotationally biases the release handle toward a position corresponding to the locked state, and wherein the handle-travel-limiter includes a pair of tabs that engage the spring.

20. The method of claim 15, further comprising: providing a handle-travel bracket fixed relative to the first recliner heart and including an aperture through which the cross-member extends and a flange portion that interferes with the flange portion of the handle-travel-limiter to limit an amount of rotational travel of the release handle.

* * * * *